United States Patent

[11] 3,585,874

| [72] | Inventor | James D. Ingham |
| | | Thomaston, Conn. |
| [21] | Appl. No. | 852,363 |
| [22] | Filed | Aug. 22, 1969 |
| [45] | Patented | June 22, 1917 |
| [73] | Assignee | The Hallden Machine Company |
| | | Thomaston, Conn. |

[54] ENERGY-BALANCED DRIVE OF A CYCLICALLY SURGING ROTARY SYSTEM
20 Claims, 10 Drawing Figs.

| [52] | U.S. Cl. | 74/393 |
| [51] | Int. Cl. | F16h 35/02 |
| [50] | Field of Search | 74/393 |

[56] References Cited
UNITED STATES PATENTS

| 3,178,959 | 4/1965 | Schwesinger | 74/393 X |
| 3,327,637 | 6/1967 | Hotta | 74/393 X |
| 3,364,667 | 1/1968 | Cunningham | 74/393 X |
| 3,393,593 | 7/1968 | Eyberger | 74/393 X |

*Primary Examiner*—Leonard H. Gerin
*Attorney*—Walter Spruegel

ABSTRACT: Two rotary systems, each including a driven gear, and a drive for the systems, including a common drive shaft and two driving gears carried thereby, of which each driving gear is paired and meshes with a driven gear, and the gears of each pair are surge gears, with the pitchline profiles of the driven gears and the mass polar moments of inertia of the systems being different so that the systems are dynamically balanced at any instant at constant angular velocity of the drive shaft.

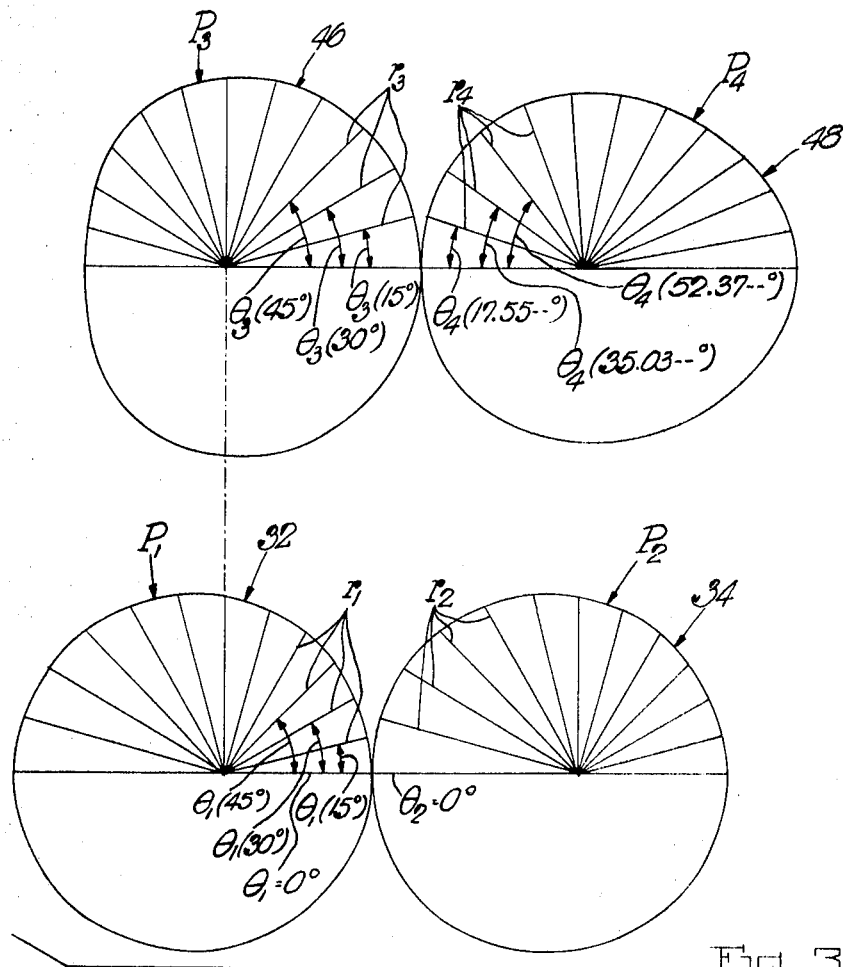
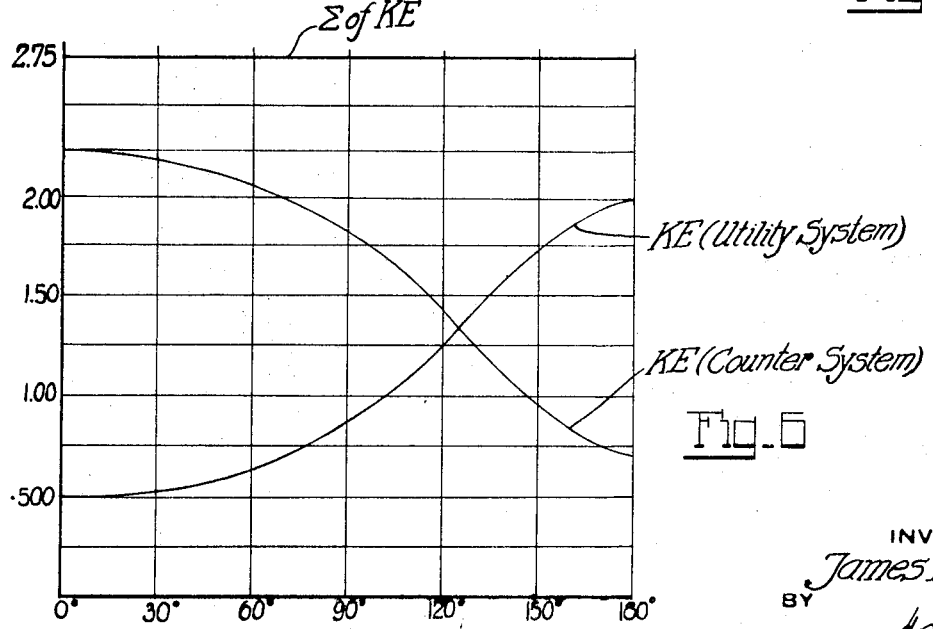

PATENTED JUN22 1971 3,585,874
SHEET 3 OF 6
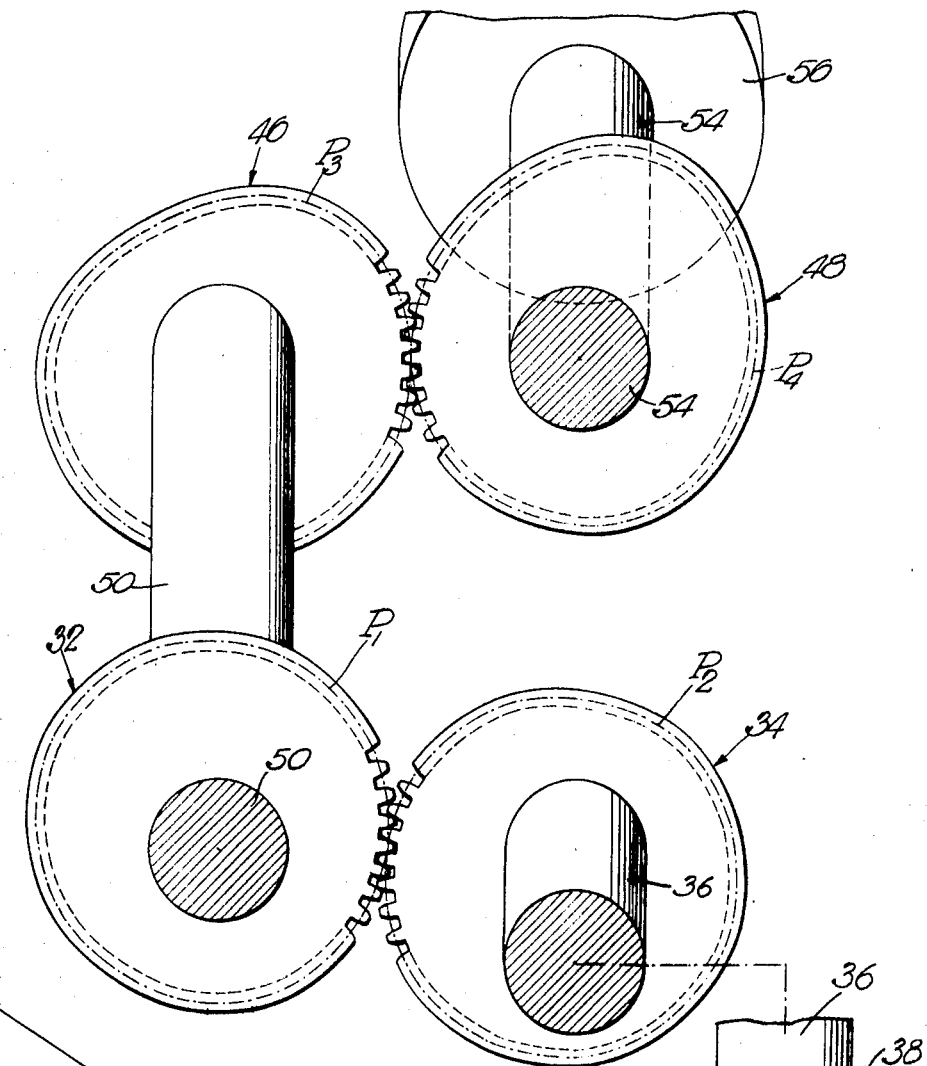
Fig. 4
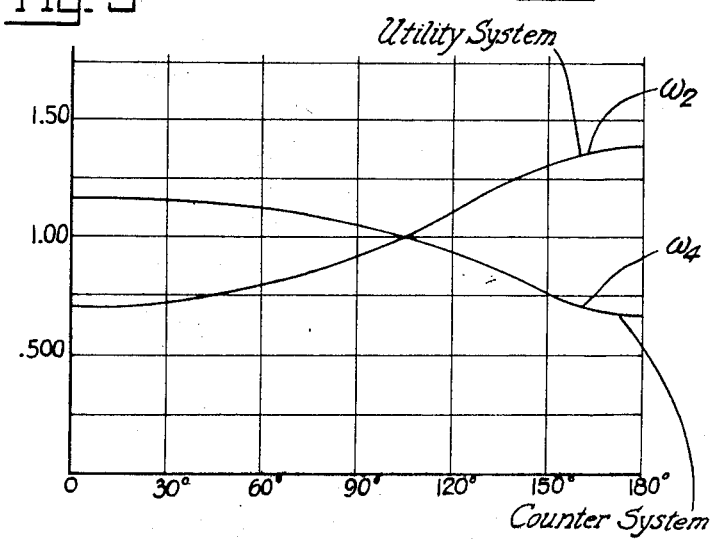
Fig. 5
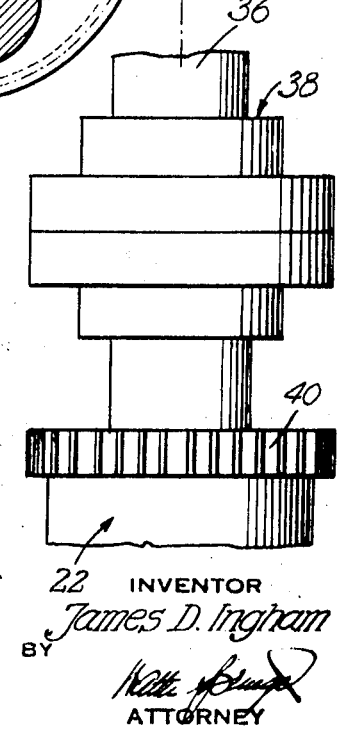
INVENTOR
James D. Ingham
BY
ATTORNEY

ENERGY-BALANCED DRIVE OF A CYCLICALLY SURGING ROTARY SYSTEM

This invention relates to dynamically balanced surging masses in general, and to dynamically balanced cyclically surging utility and counter systems in particular.

The present invention is concerned with dynamically balancing rotary utility systems of given varying velocities for each revolution. Different ones of such utility systems require different varying velocity characteristics, and among such utility systems are those, for example, which for their designated performance require cyclic surging that involves acceleration and deceleration during successive half-cycles of each revolution. In this connection, it is common practice to provide for a utility system a counter system, usually a flywheel, and to drive both systems from a common drive shaft via surge gears. In many cases, these surge gears are elliptic gears, of which a driver gear is carried by the drive shaft and two driven gears are in mesh with the driver gear and drivingly connected with the utility and counter systems, respectively. However, while these surge gears will keep unbalance between the systems at a degree which is tolerable for very low operating speeds only of the utility system, these surge gears inherently account for pulsating feedback of unbalanced torque from each system into the drive shaft, with this torque feedback assuming intolerable vibration-inducing proportions at higher operating speeds of the utility system.

With the advent of energy-balanced surge gears disclosed in the U.S. Pat. No. 2,957,363, to Ingham et al., dated Oct. 25, 1960, the operating speed of many utility systems could be greatly increased wherever desired, with the permissible increase in operating speed being no longer limited by any considerations of vibration due to unbalanced torque pulsations emanating from the utility system and its counter system. Substitution of these energy-balanced surge gears for previous surge gears in existing or new utility and counter systems, hereafter sometimes referred to as "companion" systems, is clearly indicated and has proved to be highly advantageous. However, while these energy-balanced surge gears meet the balance requirements of many companion systems, they are of no avail for many other companion systems. For example, with these energy-balanced surge gears having fixed varying-velocity characteristics for any given velocity ratio, they cannot be used for balancing companion systems requiring for the designated performance of the utility system other varying-velocity characteristics for a given velocity ratio, such as are afforded by different types of elliptic gears, for instance. AS a further example, the velocity ratios of these energy-balanced gears must be kept within a relatively narrow range in order to avoid cusps in the gear peripheries which either require complex tooth formations or prohibit tooth formation altogether, wherefore these gears do not lend themselves to companion systems requiring larger velocity ratios.

It is among the objects of the present invention to provide for companion systems surge gears of a type which have all the advantages, but none of the limitations, of the aforementioned prior energy-balanced gears, thereby to permit balancing of companion systems of many more different velocity requirements than was possible heretofore.

It is an even broader objective of the present invention to provide for companion systems surge gears of which those for the drive of the utility system, i.e., utility surge gears, may be any of the previously used and other known or determinable surge gears the velocity or other characteristics of which meet the particular requirement of the utility system, while the gears for the drive of the counter system, i.e., balance surge gears, are designed for balancing both systems. To this end, the utility surge gears are a pair of driving and driven gears of any known or determinable given velocity or other characteristics, and the balance surge gears are preferably also a single pair of driving and driven gears, with the driving gears of both pairs being carried by a common drive shaft, and the driven gears of both pairs turning with the respective systems.

It is a further object of the present invention to provide for companion systems surge gears of which the utility surge gears are a pair of any known or determinable surge gears of given velocity or other characteristics as aforementioned, and to design the balance surge gears to comply with the basic dictate that the sum of the kinetic energies of both systems, including the respective surge gears turning therewith, is at any instant constant at constant angular velocity of the common drive shaft. With this arrangement, there will be no torque surges reflected into the drive shaft, and the companion systems will be exactly balanced dynamically, for on increasing angular velocity and ensuing increasing kinetic energy of either system the angular velocity and kinetic energy of the other system will decrease at such a rate that the energy then given up by the latter system and absorbed by the former system is exactly equal to that required for its increase in energy, and vice versa.

It is another object of the present invention to provide for companion systems surge gears of which the utility surge gears are gears of any known or determinable type, and the balance surge gears are designed to satisfy the aforementioned basic kinetic-energy dictate of both systems, and to obtain for the balance surge gears profile geometries which permit ready layout of their pitchlines for production of these gears.

A further object of the present invention is to provide for companion systems surge gears of which the utility surge gears are gears of any known or determinable type of any velocity ratio required for the utility system, and to obtain for the balance surge gears profile geometries which, besides satisfying the aforementioned basic kinetic-energy dictate of both systems, permits the selection of a velocity ratio for these balance gears which may be different from that of the utility surge gears. With this arrangement, the velocity ratio of the balance surge gears may be selected to avoid in the latter any cusp formations which might be unavoidable if these gears had the same given velocity ratio as the utility surge gears. Further, even if the balance gears would lack any cusp formations at the same velocity ratio as the utility surge gears, a different and smaller velocity ratio for the balancing gears may, nevertheless, be selected for a correspondingly minimized differential between the maximum and minimum pitchline radii of each gear and resulting less ovality of the latter.

Another object of the present invention is to provide for companion systems surge gears, of which the known or determinable utility surge gears meet special requirements over and above required varying velocity characteristics, such as a gear ratio other than 1:1, or embodiment of the velocity ratio more than once, or alternating varying and constant velocity of the driven gear at constant velocity of the driver gear, for example, and to obtain for the balance surge gears profile geometries which satisfy the aforementioned basic kinetic-energy dictate of both systems.

Further objects and advantages will appear to those skilled in the art from the following, considered in conjunction with the accompanying drawings.

In the accompanying drawings, in which certain modes of carrying out the present invention are shown for illustrative purposes:

FIG. 3 illustrates the development of the pitchlines of gears embodying the invention;

FIG. 4 shows the developed gears of the present invention and their mounting and meshing relationship;

FIG. 5 is a graph depicting angular velocity characteristics of certain of the gears in FIG. 4;

FIG. 6 is a graph depicting featured kinetic-energy characteristics of certain of the gears in FIG. 4;

Figure 1:
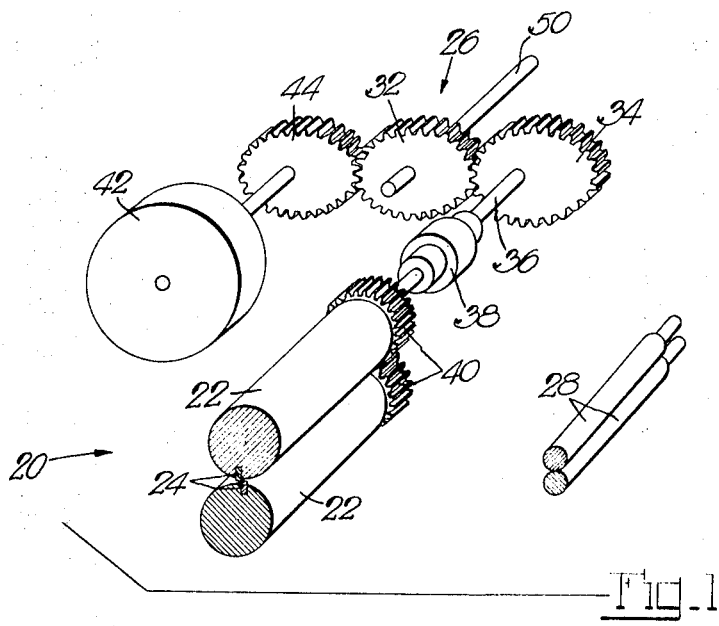
FIG. 1 is a fragmentary diagrammatic perspective view of an exemplary rotary shear to which the invention is applicable.

Referring to the drawings, and more particularly to FIG. 1 thereof, there is shown a conventional rotary shear 20 as one example of a utility system to which the present invention applies. The shear 20 has rotary companion drums 22 which are provided with longitudinal shear blades 24, respectively, that cooperate on the drive of the drums 22 to sever stock fed between them. The shear further provides a drive for the shear drums, including as a last stage thereof a gear system 26. The shear also provides cooperating feed rolls 28 which may be power-driven to feed continuous stock, such as sheet metal, for example, to the shear drums 22 at a constant rate.

The drum drive includes a drive shaft 50 that is the input shaft of the gear system 26 which provides a driving gear 32 on the drive shaft 50 and a driven gear 34 on a shaft 36. The shaft 36 is, through intermediation of an angularly adjustable coupling 38, drivingly connected with one of the shear drums 22, and both shear drums are connected by gears 40 for their joint drive in opposite directions.

The gears 32, 34 of the gear system 26 are surge gears, such as elliptic gears which are still being used in existing shears, so that the shear drums are driven in recurring speed surges with ensuing recurring torque surges in the shear system. To counteract the recurring torque surges in the shear system, i.e., the shear drums 22, shaft 36 with coupling 38 and surge gear 34, there is provided a counter system in the form of a flywheel 42 and a therewith turning surge gear 44 which forms the remaining part of the gear system 26 and is an exemplary elliptic gear in mesh with the driving gear 32.

In operation of the shear, i.e., with the drum drive and the feed-roll drive operative, continuous stock is fed at a constant rate by the feed rolls 28 to the shear drums 22, with the shear blades 24 cooperating, in this instance once during each revolution of the shear drums, to cut the stock into predetermined lengths. Assuming now that it is desired to cut continuous stock into different lengths, this may be achieved, for example, by varying or adjusting the drum drive to a corresponding r.p.m. of the shear drums without in any way varying the drive of the feed rolls 28. However, with the drum drive thus adjusted to the correct r.p.m. of the shear drums for the desired length of stock-cuts, there still remains the task of synchronizing the shear blades 24 with the feed of the stock at the times of cut, and this is achieved by appropriate angular adjustment of the gears of the gear system 26 relative to the shear drums 22 at the coupling 38, as will be readily understood.

The surge gears 32, 34 and 44 may be elliptic gears of any type. However, it is a well known fact that elliptic gears of any type, and for that matter also surge gears of nonelliptic type other than the prior energy-balanced gears disclosed in the aforementioned U.S. Pat. No. 2,957,363, to Ingham et al., fall far short of dynamically balancing the utility and counter systems, for all they can achieve is to keep unbalance between the systems at a degree which is at best tolerable at relatively low operating speeds of the utility system. It is, therefore, contemplated to provide for the shear and counter systems a gear system with which to achieve dynamic balance between the systems. While in the present exemplary shear the surging shear and counter systems may be dynamically balanced by substituting for the elliptic gears of the gear system 26 the prior energy-balanced 3-gear system, it is contemplated to provide a different gear system by which the shear and counter systems will be dynamically balanced even if the exemplary elliptic gears 32 and 34 for the drive of the shear system remain and form part of this different gear system. Therefore, in providing such a different gear system, the same will also be applicable to surging utility systems other than shears which for their contemplated performance require varying velocity characteristics that are achieved with the particular elliptic gears 32 and 34 and which could not be achieved with the prior energy-balanced gear system. In fact, and as will appear more fully hereinafter, the different gear system to be provided, including the specific elliptic gears 32 and 34 for the drive of the utility system, is but one of a number of different gear systems which meet the overall objective of providing a gear system which will dynamically balance any surging utility and counter system where two surge gears for the drive of the utility system, i.e., the "utility" gears, may be of any known or determinable type, elliptic or of any other form, having particular varying-velocity or other characteristics, including velocity ratios, which are required for the performance of any particular utility system.

Keeping in mind this overall objective, the next step is to evolve for the surge gears for the drive of the counter system, i.e., the "balance" gears, profile equations which, while derived with respect to the specific elliptic utility gears 32 and 34, are general in expression for all contemplated types of utility gears. To this end, reference is had to FIG. 2 in which the driving and driven elliptic gears 32 and 34 are represented by arbitrarily drawn reference profiles of their respective pitchlines, and the balance gears 46 and 48 whose profile geometries are to be determined are represented by also arbitrarily drawn pitchline profiles, with the driving utility and balance gears 32 and 46 being mounted on a common drive shaft 50. The elliptic utility gears 32 and 34 are in this instance focimounted gears of known profile geometries, according to which (1) $$r_1 = \frac{b^2}{\frac{D}{2} + E \cos \theta_1};$$

(2) and $$r_2 = \frac{\frac{D^2}{2} + DE \cos \theta_1 - b^2}{\frac{D}{2} + E \cos \theta_1};$$

where
$D$ = distance between the rotary axes of gears 32 and 34,
one-half the minor axis $b = \sqrt{M^2 - E^2}$,
with $M$ being equal to $D/2$, and
$E$ (eccentricity) being equal to $y - w/2$,
$r_1$ is the length of any pitchline radius of gear 32 spaced unidirectionally by an angle $\theta_1$ from the axis of symmetry $x$ of this gear, and in this example from its minimum-length radius $w$ at which $\theta_1$ is zero; and
$r_2$ is the length of the pitchline radius of gear 34 which is coordinate, i.e., continuous once during each revolution of gears 32 and 34, with the pitchline radius $r_1$ at any angle $\theta_1$.

Since the relationship $r_1/r_2$ is essential in arriving at the profile equations of the balance gears 46 and 48, this relationship is expressed as $$\frac{r_1}{r_2} = \frac{\frac{b^2}{\frac{D}{2} + E \cos \theta_1}}{\frac{\frac{D^2}{2} + DE \cos \theta_1 - b^2}{\frac{D}{2} + E \cos \theta_1}}$$

This reduces to $$\frac{r_1}{r_2} = \frac{b^2}{\frac{D^2}{2} + DE \cos \theta_1 - b^2}$$

This expression may be simplified by substituting $A$ for $b^2$, $B$ for $\dfrac{D^2}{2} - b^2$, and $C$ for $DE$;

Accordingly, (3) $\qquad \dfrac{r_1}{r_2} = \dfrac{A}{B + C \cos \theta_1}$

In order to achieve dynamic balance of the utility and counter systems at uniform velocity of the drive shaft 50, it is imperative that either system is to give up or absorb energy at the same rate at which energy is being absorbed or given up, respectively, by the other system. Thus, when the angular velocity, and hence also the kinetic energy, of one system increase, for example, the angular velocity of the other system must decrease at such a rate that the kinetic energy given up or dissipated by the latter system is exactly equal to that required for the increase of kinetic energy of the one system. Since under these conditions the rate of interchange of kinetic energy between the two systems is equal but opposite in sign, there will be no unbalanced torque in the drive shaft and both systems are dynamically balanced. At this specific rate of interchange of kinetic energy between the systems, the sum of the kinetic energies of both systems is constant at any instant.

The kinetic energy of the utility system at any instant is $$KE_2 = (1/2) I_2 \omega_2^2$$

where $I_2$ is the mass polar moment of inertia of the utility system, and $\omega_2$ is the angular velocity of this system and, hence, that of the driven utility gear 34. The kinetic energy of the counter system at any instant is $$KE_4 = (1/2) I_4 \omega_4^2$$

where $I_4$ is the mass polar moment of inertia of the counter system, and $\omega_4$ is the angular velocity of this system and, hence, that of the driven balance gear 48.

In accordance with the above dictate respecting the sum of the kinetic energies of both systems, (4) $\qquad KE_2 + KE_4 = \text{Constant} = Z$.

An important factor in arriving at profile equations for balance gears which achieve the required dynamic balance between the two systems, was the determination that the mass polar moments of inertia of the utility and counter systems cannot be equal but must be different in the first place, and that they must have the relation $I_4 = x^2 I_2$ in the second place, where $x$ is a constant depending on certain particulars of the utility gears 32 and 34, as will appear hereinafter. Accordingly, $$\tfrac{1}{2} I_2 \omega_2^2 + \tfrac{1}{2} x^2 I_2 \omega_4^2 = Z.$$

Since $\omega_2 = \dfrac{r_1}{r_2} \omega_1$; and $\omega_4 = \dfrac{r_3}{r_4} \omega_3$, where $r_3$ and $r_4$ are coordinate pitchline radii of the gears 46 and 48 displaced by the angles $\theta_3$ and $\theta_4$ from the radii $r_3'$ and $r_4'$ at which these angles are zero, and since the pitchline 32 and 46 are carried by the common drive shaft 50 so that $\omega_3 = \omega_1$, it follows that $$\tfrac{1}{2} I_2 \left(\dfrac{r_1}{r_2} \omega_1 \right)^2 + \tfrac{1}{2} I_2 x^2 \left( \dfrac{r_3}{r_4} \omega_1 \right)^2 = Z.$$

By letting $1/2\, I_2\, \omega_1^2$ be equal to the arbitrary value 1, and further reducing the preceding equation, the latter becomes $$\left(\dfrac{r_1}{r_2}\right)^2 + x^2 \left(\dfrac{r_3}{r_4}\right)^2 = Z.$$

This is the basic equation on which the evolvement of the profile equations for the balance gears is predicated. This equation reflects the relation of the magnitudes of the kinetic energies of the utility and counter systems at any constant velocity of the common drive shaft, and expresses that the kinetic energy of the utility system plus the kinetic energy of the counter system must be constant at any instant.

Next, equations for $r_3$ and $r_4$ are to be evolved from basic equation 5. Thus, equation 5 may be expressed as follows:

(6) $\qquad \left(\dfrac{A}{B + C \cos \theta_1}\right)^{2-x^2} \left(\dfrac{r_3}{r_4}\right)^2 = Z$ where $$\dfrac{A}{B + C \cos \theta_1} = \dfrac{r_1}{r_2}$$

(see equation 3), and $A$, $B$, $C$, and $\theta$, have known or determinable numerical values. It follows from equation 6, that (7) $\qquad \dfrac{r_3}{r_4} = \dfrac{1}{x} \sqrt{Z - \left( \dfrac{A}{B+C \cos \theta_1} \right)^2}$ With the distance between the rotary axes of the balance gears 46 and 48 being preferably equal to $D$, it follows that the combined lengths of any coordinate pitchline radii $r_3$ and $r_4$ are equal to $D$. Thus $$r_3 + r_4 = D, \text{ or } r_4 = D - r_3$$

Using the last expression for $r_4$ in equation 7, the latter reads $$\dfrac{r_3}{D - r_3} = \dfrac{1}{x} \sqrt{Z - \left(\dfrac{A}{B+C \cos \theta_1}\right)^2}$$

from which follows that $$r_3 = \dfrac{D}{x} \sqrt{Z - \left(\dfrac{A}{B+C \cos \theta_1}\right)^2} - \dfrac{r_3}{x} \sqrt{Z - \left(\dfrac{A}{B+C \cos \theta_1}\right)^2}$$

or $$r_3 \left( 1 + \dfrac{1}{x} \sqrt{Z - \left(\dfrac{A}{B+C \cos \theta_1}\right)^2} \right) = \dfrac{D}{x} \sqrt{Z - \left(\dfrac{A}{B+C \cos \theta_1}\right)^2}$$

wherefore $$r_3 = \dfrac{\dfrac{D}{x} \sqrt{Z - \left(\dfrac{A}{B+C \cos \theta_1}\right)^2}}{1 + \dfrac{1}{x} \sqrt{Z - \left(\dfrac{A}{B+C \cos \theta_1}\right)^2}}$$

which may be reduced to (8) $\qquad r_3 = \dfrac{D \sqrt{Z - \left(\dfrac{A}{B+C \cos \theta_1}\right)^2}}{x + \sqrt{Z - \left(\dfrac{A}{B+C \cos \theta_1}\right)^2}}$ As already mentioned, $r_4 = D - r_3$. Accordingly, using expression 8 for $r_3$ $$r_4 = D - \dfrac{D \sqrt{Z - \left(\dfrac{A}{B+C \cos \theta_1}\right)^2}}{x + \sqrt{Z - \left(\dfrac{A}{B+C \cos \theta_1}\right)^2}}$$

or $$r_4 = \dfrac{Dx + D \sqrt{Z - \left(\dfrac{A}{B+C \cos \theta_1}\right)^2} - D \sqrt{Z - \left(\dfrac{A}{B+C \cos \theta_1}\right)^2}}{x + \sqrt{Z - \left(\dfrac{A}{B+C \cos \theta_1}\right)^2}}$$

which reduces to (9) $\qquad r_4 = \dfrac{Dx}{x + \sqrt{Z - \left(\dfrac{A}{B+C \cos \theta_1}\right)^2}}$ In expressions 8 and 9 for $r_3$ and $r_4$, only $x$ and $Z$ are of unknown values, while the values of $A$, $B$, $C$ and $\theta_1$ are known or determinable. A value for the constant $Z$ depends on, and is derived from the expression for, the assigned velocity ratio $V_r$ of the balance gears 46 and 48. This velocity ratio $V_r$ is selected, and may be the same as, or different from, the velocity ratio of the utility gears 32 and 34. Thus, $$V_r = \frac{\frac{r_{3\,max}}{r_{4\,min}}}{\frac{r_{3\,min}}{r_{4\,max}}}$$

or, by using the expression 7 for $r_3/r_4$,

(10)
$$V_r = \frac{\frac{1}{x}\sqrt{Z-\left(\frac{A}{B+C\cos\theta_1}\right)^2}}{\frac{1}{x}\sqrt{Z-\left(\frac{A}{B+C\cos\theta_1}\right)^2}}$$

Figure 2:
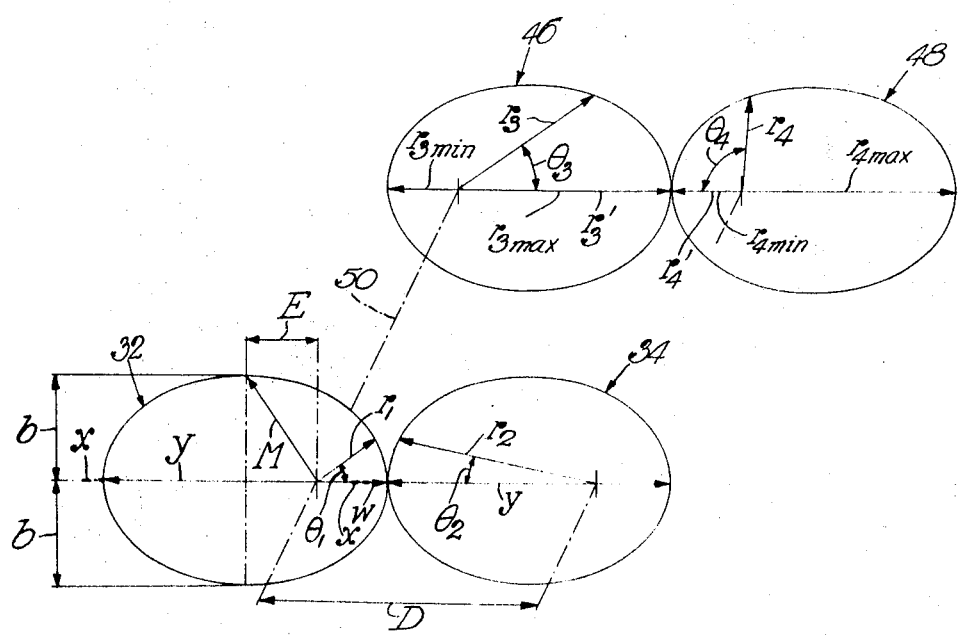
FIG. 2 is a diagrammatic lay-out of a set of gears of arbitrary outline for reference purposes in the derivation of the correct profile geometries of gears embodying the invention.

It will be noted from equation 7 that the relationship between any particular coordinate pitchline radii $r_3$ and $r_4$ is given with respect to the corresponding angle $\theta_1$, and it follows from FIG. 2, that for $r_3\,max/r_4\,min$, the corresponding angle $\theta_1$ is $0°$, whose cosine is $+1$, and for $r_3\,min/r_4\,max$ the corresponding angle $\theta_1$ is $180°$, whose cosine is $-1$. Accordingly, using these cosine values in equation 10, the latter reduces to $$V_r = \frac{\frac{1}{x}\sqrt{Z-\left(\frac{A}{B+C}\right)^2}}{\frac{1}{x}\sqrt{Z-\left(\frac{A}{B-C}\right)^2}}$$

which further reduces to $$V_r = \frac{\sqrt{Z-\left(\frac{A}{B+C}\right)^2}}{\sqrt{Z-\left(\frac{A}{B-C}\right)^2}}$$

Since $A/B+C$ is equal to $r_1/r_2$ at $\theta_1=0°$, it will be noted from FIG. 2 that $$A/B+a[C = r_1\,min/r_2\,max\,;$$

and since $A/B-C$ is equal to $r_1/r_2$ at $\theta_1=180°$, it will be noted from FIG. 2 that $$A/B-a[C = r_1\,max/r_2\,min\,;$$

Accordingly

(11)
$$V_r = \frac{\sqrt{Z-\left(\frac{r_{1min}}{r_{2max}}\right)^2}}{\sqrt{Z-\left(\frac{r_{1max}}{r_{2min}}\right)^2}}$$

This expression for $V_r$ is used to derive an expression for $Z$. Thus $$V_r^2 Z - Z = V_r^2\left(\frac{r_{1max}}{r_{2min}}\right)^2 - \left(\frac{r_{1min}}{r_{2max}}\right)^2$$

or

(12)
$$Z = \frac{V_r^2\left(\frac{r_{1max}}{r_{2min}}\right)^2 - \left(\frac{r_{1min}}{r_{2max}}\right)^2}{V_r^2 - 1}$$

In this equation, numerical values of $V_r$ and of the various radii are known or determinable, wherefore a value of $Z$ for a particular velocity ratio $V_r$ may be obtained.

The earlier mentioned constant $x$ becomes a factor in determining the lengths of coordinate pitchline radii $r_3$ and $r_4$ of the balance gears 46 and 48 from the $r_3$ and $r_4$ expressions 8 and 9, so that these gears meet the imperative requirement of gear compatibility, i.e., their pitchline peripheries must be of equal lengths in order that either gear will turn through one complete revolution while the other gear turns through one complete revolution. Thus, for gear compatibility of the balance gears 46 and 48, it is imperative that $r_3 d\theta_3 = r_4 d\theta_4$, where $r_3$ and $r_4$ are coordinate pitchline radii. It follows from this equation that $d\theta_4 = r_3/r_4\,dg$ on the common drive shaft 50 (FIG. 2), $\theta_3$ is equal to $\theta_1$. Accordingly, $d\theta_4 = r_3/r_4\,d\theta_1$ and by using the expression 7 for $r_3/r_4$, $$d\theta_4 = \frac{1}{x}\sqrt{Z-\left(\frac{A}{B+C\cos\theta_1}\right)^2}\,d\theta_1$$

wherefore the integral of $d\theta_4$ between $o$ and $\pi$ is (12a)
$$\int_0^\pi d\theta_4 = \frac{1}{x}\int_0^\pi \sqrt{Z-\left(\frac{A}{B+C\cos\theta_1}\right)^2}\,d\theta_1$$

Figure 9:
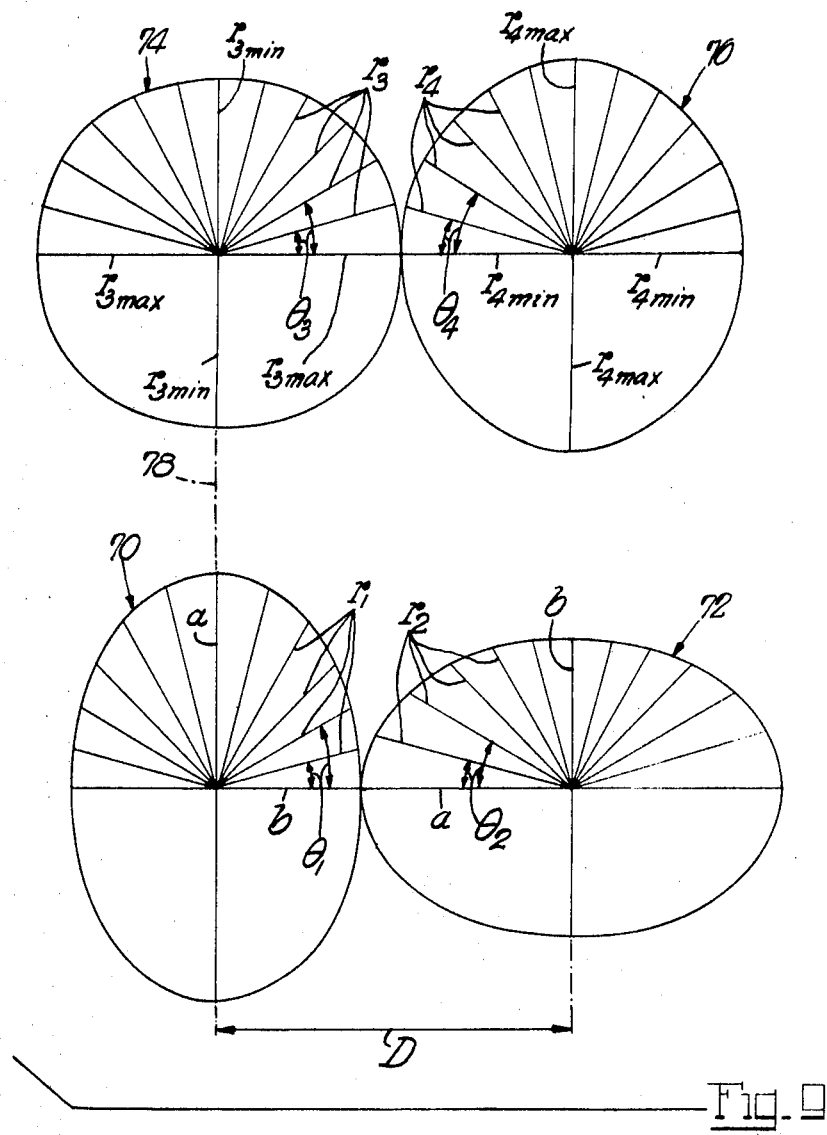
FIGS. 9 and 10 show pitchline profiles of further modified gears embodying the invention.
Figure 10:
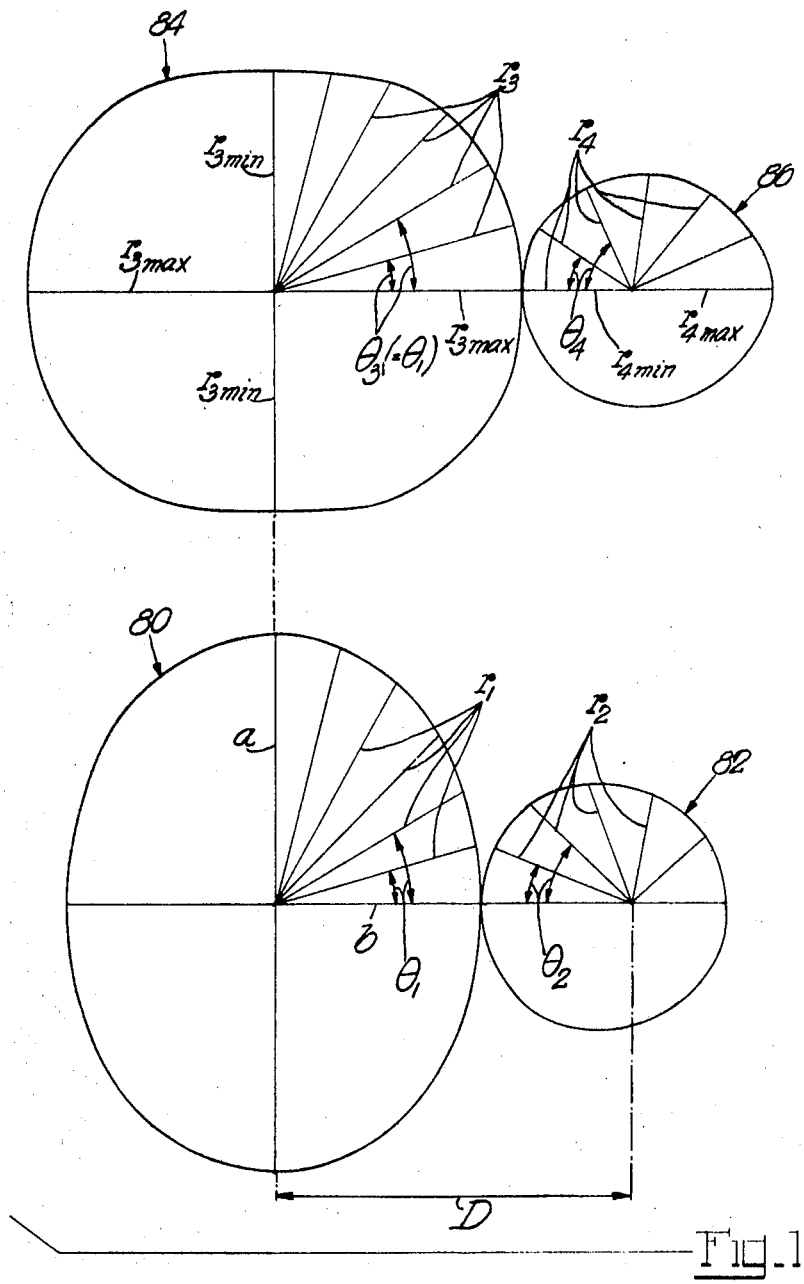

This equation is correct for the exemplary balance gears 46, 48 which, like the exemplary utility gears 32 and 34, have a 1 to 1 gear ratio and embody the velocity ratio once over their entire peripheries. However, this equation would require modification for utility gears and, hence, balance gears whose gear ratio is other than 1 to 1, or whose velocity ratio is embodied more than once in these gears, for example. For example, FIG. 9 shows modified utility and balance gears 70, 72 and 74, 76 which embody the velocity ratio twice, or once over each $180°$. This means that in these particular gears the varying velocity curve from $r_{min}$ to $r_{max}$ of their pitchline profiles extends twice over each symmetrical half of these profiles, whereas in the gears 32, 34 and 46, 48 (FIG. 2) the varying velocity curve from $r_{min}$ to $r_{max}$ of their pitchline profiles extends only once over each symmetrical half of these profiles. Accordingly, for the gears 70, 72 and 74, 76 of FIG. 9, the limits of the integrals in equation 12a above would be between $0°$ and $90°$, i.e. between zero and $\pi/2$. For another example, FIG. 10 shows further modified utility and balance gears 80, 82 and 84, 86 of a gear ratio other than 1 to 1. In this particular case, the gear ratio of the driven and driving utility gears 80 and 82 is 2 to 1. This means that in the driven gears 82 and 86 the varying velocity curve from $r_{min}$ to $r_{max}$ of their pitchline profiles extends once over each symmetrical half of these profiles, and in the driver gears 80 and 84 the varying velocity curve from $r_{min}$ to $r_{max}$ of their pitchline profiles extends twice over each symmetrical half of these profiles. Accordingly, for these gears, the limits of the integral of $d\theta_4$ in equation 12a above would be between $0°$ and $180°$, i.e. between zero and $\pi/1$, and the limits of the other integral in this equation, relating to the utility driver gear 80, would be between $0°$ and $90°$, i.e. between zero and $\pi/2$.

It follows from the preceding that equation 12a will be applicable to gears of any of the aforementioned and also other requirements on modifying the same as follows, $$\int_0^{\frac{\pi}{n_2}} d\theta_4 = \frac{1}{x}\int_0^{\frac{\pi}{n_1}} \sqrt{Z-\left(\frac{A}{B+C\cos\theta_1}\right)^2}\,d\theta_1$$

where $n_1$ is equal to $180°$ divided by the subtended angle in degrees between $r_{min}$ and $r_{max}$ of the driving utility gear, and $n_2$ is equal to $180°$ divided by the subtended angle in degrees between $r_{min}$ and $r_{max}$ of the driven utility gear. Therefore, $$\frac{\pi x}{n_2} = \int_0^{\frac{\pi}{n_1}} \sqrt{Z-\left(\frac{A}{B+C\cos\theta_1}\right)^2}\,d\theta_1$$

and $$x = \frac{n_2}{\pi}\int_0^{\frac{\pi}{n_1}} \sqrt{Z-\left(\frac{A}{B+C\cos\theta_1}\right)^2}\,d\theta_1$$

where $$\frac{A}{B+C\cos\theta_1}$$

is the known or determinable value of $$\frac{r_1}{r_2}$$

for any angle $\theta_1$ between 0° and 180°. Accordingly,

(13)
$$x = \frac{n_2}{\pi} \int_0^{\pi/n_1} \sqrt{Z - \left(\frac{r_1}{r_2}\right)^2} d\theta_1$$

With values of $Z$ and $r_1/r_2$ for any angle $\theta_1$ being given or determinable and with $n_1$ and $n_2$ being equal to 1 in the case of the exemplary utility gears 32, 34 (FIG. 2), $x$ may be solved by any known method of numerical integration. Accordingly, having once obtained values of $x$ and $Z$, and also values of $A$, $B$ and $C$, the expressions 8 and 9 will furnish the lengths of the pitchline radii $r_3$ and $r_4$ of the balance gears 46 and 48 with respect to any angle $\theta_1$.

It will be noted that in the expressions 8 and 9 for $r_3$ and $r_4$ the relationship $r_1/r_2$ for any angle $\theta_1$ is expressed as $$A/B+C \cos \theta_1$$

for ready determination of $r_1/r_2$ on hand of the exemplary given or determinable values of $A$, $B$ and $C$. Thus, with values of $r_1/r_2$ being obtained in this exemplary fashion, it is proper to express $r_3$ and $r_4$ in the following general manner

(14)
$$r_3 = \frac{D\sqrt{Z - \left(\frac{r_1}{r_2}\right)^2}}{x + \sqrt{Z - \left(\frac{r_1}{r_2}\right)^2}}$$

and

(15)
$$r_4 = \frac{Dx}{x + \sqrt{Z - \left(\frac{r_1}{r_2}\right)^2}}$$

where $r_1$ and $r_2$ are coordinate radii, the pitchline radius $r_3$ is displaced from the pitchline radius $r_3$ (FIG. 2) by an angle $\theta_3$ which is equal to the angle $\theta_1$ associated with the particular $r_1/r_2$ used in expression 14 for the length determination of $r_3$, and $r_4$ is the pitchline radius which is coordinate with the pitchline radius $r_3$ whose angle $\theta_3$ is equal to the angle $\theta_1$ associated with the particular $r_1/r_2$ used in expression 15 for the length determination $r_4$.

There may thus be obtained from equation 14 the lengths of radii $r_3$ for sufficient angles $\theta_3$ to permit an accurate layout of the pitchline of the driving balance gear 46. Further, there may be obtained directly from equation 15 the length of any radius $r_4$, or the length of any radius $r_4$ may be determined by subtracting from the distance D the length of its coordinate radius $r_3$.

While it is possible to lay out the pitchline of the driven balance gear 48 by laying out many determined radii $r_4$ in close spaced relation with each other and with their coordinate radii $r_3$, it is far easier and more accurate for the layout of the pitchline of the driven balance gear to find for the calculated length of each radius $r_4$ its exact angle $\theta_4$ (FIG. 2). In this connection, it is known that $$r_3 d\theta_3 = r_4 d\theta_4,$$

hence
$$d\theta_4 = (r_3/r_4) d\theta_3.$$

Further, since $\theta_3 = \theta_1$, it follows that
$$d\theta_4 = (r_3/r_4) d\theta_1.$$

Since
$$\frac{r_3}{r_4} = \frac{1}{x}\sqrt{Z - \left(\frac{A}{B+C \cos \theta_1}\right)^2}$$

(see Equation 7), or $$\frac{r_3}{r_4} = \frac{1}{x}\sqrt{Z - \left(\frac{r_1}{r_2}\right)^2}$$

$$d\theta_4 = \frac{1}{x}\sqrt{Z - \left(\frac{r_1}{r_2}\right)^2} d\theta_1$$

wherefore

(16)
$$\theta_4 = \frac{1}{x}\int_0^{\theta_1} \sqrt{Z - \left(\frac{r_1}{r_2}\right)^2} d\theta_1$$

Thus, the general equation 16 will by any known method of numerical integration yield the value of $\theta_4$ for any radius $r_4$.

Following is an exemplary determination of the pitchline profiles $P_3$ and $P_4$ (FIG. 3) of balance gears 46 and 48 which are derived with respect to the exemplary foci-mounted elliptic utility gears 32 and 34 to meet the requirements of the basic equation 5. Numerical values for $r_1$ and $r_2$ at different angles $\theta_1$ for the utility gears 32, 34 may readily be obtained from equations 1 and 2 after known values of $D$, $b$ and $E$. In this particular example, let it be assumed that for the utility gears 32 and 34 only their velocity ratio $V_r$ and the distance $D$ between their rotary axes are given, with $V_r = 2.01$ to 1, and $D = 10$ inches. With these two exemplary values given, the lengths of sufficient radii $r_1$ and coordinate radii $r_2$ at different angles $\theta_1$ may be determined for accurate layout of the pitchline peripheries $P_1$ and $P_2$ of the gears 32 and 34.

Thus, with reference to FIG. 2, it will be noted that $(y^2/w^2) = V_r = 2.01$, $y+w = 10$, and $y = 10-w$, wherefore, $y^2 = (10-w)^2 = 100 - w + w^2$.
With $y^2$ being also equal to 2.01 $w^2$, it follows that
$100 - 20w + w^2 = 2.01 w^2$, from which the value of $w$ may be obtained, with this calculated value being in this instance 4.13608601.
With $y$ being equal to $10-w$, the value of $y$ is 5.86391399. With the values of $w$ and $y$ being now known, the value of $b$ is readily obtained from the earlier expression
$$b = \sqrt{M^2 - E^2}.$$
where $M$ being equal to $D/2$, and $E$ being equal to $y-w/2$: with $b$ having in this instance the calculated value 4.92479975. We now have all the values needed for calculation of the actual radii $r_1$ and $r_2$ for any angles $\theta_1$ from the $r_1$ and $r_2$ expressions 1 and 2.

Listed in the following Table I are actual lengths of pitchline radii $r_1$ of the driving utility gear 32 at their respective displacement angles $\theta_1$ which in this instance are spaced apart by 15° intervals. Listed also are the actual lengths of pitchline radii $r_2$ of the driven utility gear 34 which are coordinate with the listed radii $r_1$. This table also lists calculated values of $(r_1/r_2)^2$ since these will be used subsequently in equations 14 and 15 for the determination of the pitchline radii $r_3$ and $r_4$ of the balance gears 46 and 48.

TABLE I

| $\theta_1$, degrees | $r_1$ | $r_2$ | $\left(\frac{r_1}{r_2}\right)^2$ |
|---|---|---|---|
| 0 | 4.13608602 | 5.86391398 | .49751242 |
| 15 | 4.15695418 | 5.84304582 | .50614142 |
| 30 | 4.21936836 | 5.78063164 | .53277555 |
| 45 | 4.32261163 | 5.67738837 | .57968921 |
| 60 | 4.46499351 | 5.53500649 | .65073683 |
| 75 | 4.64309381 | 5.35690619 | .75125405 |
| 90 | 4.85073051 | 5.14926949 | .88740740 |
| 105 | 5.07780736 | 4.92219264 | 1.06422932 |
| 120 | 5.30941855 | 4.69058145 | 1.28126971 |
| 135 | 5.52585694 | 4.47414306 | 1.52538523 |
| 150 | 5.70428745 | 4.29571255 | 1.76332504 |
| 165 | 5.82247441 | 4.17752559 | 1.94257114 |
| 180 | 5.86391391 | 4.13608609 | 2.01 |

These listed radii $r_1$ and $r_2$ are for the present purpose sufficient in number for fairly accurate layout of the actual pitchline profiles $P_1$ and $P_2$ of the utility gears at a reduced scale in FIG. 3, with the radii $r_1$ being there laid out for the listed angles $\theta_1$ at 15° intervals. With the utility gears 32 and 34 being in this instance identical, the angles $\theta_2$ of the listed radii $r_2$ were not determined, and the radii $r_2$ shown in FIG. 3 for the layout of the pitchline profile $P_2$ are not the listed ones but are duplicates of the radii $r_1$ for layout of the pitchline profile $P_2$ as a duplicate of the pitchline profile $P_1$. Further, with each of the gears 32 and 34 having an axis of symmetry on which the respective angles $\theta_1$ and $\theta_2$ are 0° and 180° (FIG. 3), the listed values of $r_1$ may be used for layout of the other halves of the pitchline profiles $P_1$ and $P_2$.

Since the particulars of the profile geometries of the utility gears 32, 34 for evolvement of the profile geometries of the balance gears 46 and 48 are now known, with these particulars being values of $r_1$ and $r_2$ for given angles $\theta_1$, one may now proceed with the evolvement of the actual profile geometries of the balance gears.

Before having recourse to the expressions 14 and 15 for determination of the actual lengths of radii $r_3$ and $r_4$ with respect to various angles $\theta_1$, the values for $Z$ and $x$ will first have to be determined.

A value for $Z$ is readily obtained from expression 12 once a velocity ratio $V_r$ of the balance gears 46, 48 is selected. In this connection, the exemplary velocity ratio of the utility gears is 2.01 to 1. It has been found that if $Z$ were calculated on the basis of the same velocity ratio 2.01 to 1 for the balance gears, the pitchline profiles of these balance gears would have cusp formations. Accordingly, in order to avoid any cusp formations in the balance gears, a smaller velocity ratio $V_r$ has been selected, with this velocity ratio being 1.75.

With this velocity ratio of 1.75, and with the given values of the various radii $r_1$ and $r_2$ appearing in expression 12, the value of $Z$ became 2.74332731. Since $Z$, rather than $V_r$, is a factor in the expressions 14 and 15 for $r_3$ and $r_4$, the value of $Z$ was rounded out to 2.75, whereby the velocity ratio $V_r$ for the balance gears changed from 1.75 to 1.74467824.

The next task is to obtain the value of $x$ from expression 13. Thus, with values of $Z$ and $(r_1/r)^2$ known, and $n_1 = n_2 = 1$ in this instance, there was obtained a value of 1.28141188 for $x$ on integrating expression 13.

Recourse is next had to expressions 14 and 15 for obtaining values, i.e., actual lengths, of pitchline radii $r_3$ and $r_4$. Thus, using the known values of $D$, $Z$, $x$, and $r_1/r_2$ for given angles $\theta_1$, expressions 14 and 15 yielded the values for $r_3$ and $r_4$ listed in the following Table II for angles $\theta_3$ (equal to $\theta_1$) from 0° to 180° at 15° intervals. Further listed in this Table II are the calculated values of $x^2(r_3/r_4)^2$ for the listed values of coordinate radii $r_3$ and $r_4$, because these values of $x^2(r_3/r_4)^2$ will be used for a purpose explained hereinafter. Also listed in this Table II are the angles $\theta_4$ of the radii $r_4$ which are coordinate to the radii $r_3$ at their listed angles $\theta_3$, with the values of $\theta_4$ having been obtained by integration of expression 16.

TABLE II

| $\theta_3$, degrees | $r_3$ | $r_4$ | $x^2\left(\dfrac{r_3}{r_4}\right)^2$ | $\theta_4$ |
|---|---|---|---|---|
| 0 | 5.39431720 | 4.60568280 | 2.25248751 | 0 |
| 15 | 5.38954890 | 4.61045110 | 2.24385853 | 17.5516 |
| 30 | 5.37471010 | 4.62528990 | 2.21722442 | 35.0342 |
| 45 | 5.34811760 | 4.65188240 | 2.17031076 | 52.3704 |
| 60 | 5.30669120 | 4.69330850 | 2.09926299 | 69.4731 |
| 75 | 5.24554600 | 4.75445400 | 1.99874586 | 86.2280 |
| 90 | 5.15750330 | 4.84249670 | 1.86259247 | 102.4906 |
| 105 | 5.03287180 | 4.96712820 | 1.68577059 | 118.0777 |
| 120 | 4.86062770 | 5.13937230 | 1.46873022 | 132.7702 |
| 135 | 4.63403220 | 5.36596780 | 1.22461465 | 146.3494 |
| 150 | 4.36674420 | 5.63325590 | .98667480 | 158.6312 |
| 165 | 4.12191600 | 5.87808400 | .80742866 | 169.7042 |
| 180 | 4.01669160 | 5.98330840 | .73999991 | 180.0000 |

These given radii $r_3$ and $r_4$ are sufficient in number for the present purpose of fairly accurately plotting the actual pitchline profiles $P_3$ and $P_4$ of the balance gears 46, 48 at a reduced scale in FIG. 3, with the radii $r_3$ and $r_4$ being there laid out for the listed angles $\theta_3$ and $\theta_4$. Further, with each of the balance gears 46 and 48 having an axis of symmetry at which the respective angles $\theta_3$ and $\theta_4$ are 0° and 180°, the listed radii $r_3$ and $r_4$ and their also listed angles $\theta_3$ and $\theta_4$ permit ready layout of the other halves of the pitchline profiles $P_3$ and $P_4$, as will be readily understood.

FIG. 4 shows the utility and balance gears 32, 34 and 46, 48 of the pitchline profiles plotted in FIG. 3 and with their respective teeth cut, with the driver gears 32 and 46 being on the common drive shaft 50, and the pairs of gears being shown in relative angular positions in which their axes of symmetry are out of alignment. In using these gears in the exemplary shear 20, the gears 32 and 34 in FIG. 1 will be the exact utility gears 32 and 34 of FIGS. 3 and 4, gear 44 and its flywheel 42 are eliminated (FIG. 1), the driving balance gear 46 is on the common drive shaft 50 and in mesh with the driven balance gear 48 on a shaft 54 which also carries a flywheel 56 (FIG. 4), with the driven balance gear 48, shaft 54 and flywheel 56 forming the counter system of the exemplary shear. Also shown in FIG. 4 is the utility system, consisting of the driven utility gear 34, shaft 36, coupling 38, a pair of companion shear drums 22, and a pair of gears 40 which drivingly connect the drums 22. In this exemplary shear arrangement, the torques in the drive shaft 50 emanating from the shear and counter systems are, at uniform velocity of the drive shaft, of the same magnitude, but opposite in sign, at any instant, wherefore these torques cancel each other and there is no unbalanced torque in the drive shaft, provided, of course, that the mass polar moments of inertia of the two systems are of the earlier stated relationship $I_4 = x^2 I_2$, where $I_4$ and $I_2$ are the mass polar moments of inertia of the respective counter and shear (utility) systems. That there is then no unbalanced torque in the drive shaft 50 is due to the fact that at uniform velocity of the drive shaft the rate of interchange of kinetic energy between the two systems is equal but opposite in sign, and the sum of the kinetic energies of both systems is also constant at any instant, in accordance with the described dictates of the basic equation 5.

That the instantaneous kinetic energies of both systems indeed meet the requirements of this basic equation 5 will now be proved by actual kinetic energy relationships of the two systems in the following Table III.

TABLE III

| $\theta_1, (\theta_3)$, degrees | $\left(\dfrac{r_1}{r_2}\right)^2$ | $x^2\left(\dfrac{r_3}{r_4}\right)^2$ | $\Sigma$ of $\left(\dfrac{r_1}{r_2}\right)^2 + x^2\left(\dfrac{r_3}{r_4}\right)^2$ | $\Delta\left(\dfrac{r_1}{r_2}\right)^2$ | $\Delta x^2\left(\dfrac{r_3}{r_4}\right)^2$ |
|---|---|---|---|---|---|
| 0 | .49751242 | 2.25248715 | 2.74999957 | | |
| 15 | .50614142 | 2.24385853 | 2.74999995 | +.00862900 | −.00862862 |
| 30 | .53277555 | 2.21722442 | 2.74999997 | +.02663413 | −.02663411 |
| 45 | .57968921 | 2.17031076 | 2.74999997 | +.04691366 | −.04691366 |
| 60 | .65073683 | 2.09926299 | 2.74999982 | +.07104762 | −.07104777 |
| 75 | .75125405 | 1.99874586 | 2.74999991 | +.10051722 | −.10051713 |
| 90 | .88740740 | 1.86259247 | 2.74999987 | +.13615335 | −.13615339 |
| 105 | 1.06422932 | 1.68577059 | 2.74999991 | +.17682192 | −.17682188 |
| 120 | 1.28126971 | 1.46873022 | 2.74999993 | +.21704039 | −.21704037 |
| 135 | 1.52538523 | 1.22461465 | 2.74999988 | +.24411552 | −.24411557 |
| 150 | 1.76332504 | .98667480 | 2.74999984 | +.23793981 | −.23793985 |
| 165 | 1.94257114 | .80742866 | 2.74999980 | +.17924610 | −.17924614 |
| 180 | 2.01 | .73999991 | 2.74999991 | +.06742886 | −.06742875 |

In this Table III, the values of $(r_1/r)^2$ and coordinate values of $x^2(r_3/r_4)^2$ with respect to the angles $\theta_1$ from 0° to 180° at 15° intervals, were taken from Tables I and II. As earlier explained in connection with the basic equation 5, the values of $x^2(r_3/r_4)^2$ and of $(r_1/r)^2$ reflect the true relation of the magnitudes of the kinetic energies of the counter and utility systems, respectively, where their mass polar moments of inertia are of the described relation $I_4 = x^2 I_2$, as they must be for balance. Accordingly, with the counter and utility systems designed so that their respective mass polar moments of inertia are of this relationship, the utility system will be balanced by the counter system at any instant at uniform velocity of the common drive shaft 50, and Table III above proves this. Thus, with the listed values of $(r_1/r)^2$ and of $x^2(r_3/r_4)^2$ in this table representing kinetic energies proportional to the kinetic energies of the utility and counter systems, these kinetic energy values must also satisfy the explained dictates of the basic equation 5 in point of kinetic energy exchange between the systems and the sum total of their kinetic energies at any instant. In this connection, note in Table III the column headed by $\Sigma \text{of}(r_1/r_2)^2 + x^2 (r_3/r_4)^2$ (i.e., the sum of the kinetic energies), in which the sum of the listed kinetic energies is indeed constant with respect to any of the listed angles $\theta_1$, with this constant being exactly 2.75, i.e., the calculated value of $Z$. The listed sums of the kinetic energies deviate slightly from the exact value 2.75, but they would exactly total 2.75 at still greater accuracy of the listed values of $(r_1/r)^2$ and $x^2 (r_3/r_4)^2$.

The two further columns in Table III, headed by $\Delta(r_1/r_2)^2$ and $\Delta x^2(r_3/r_4)^2$, list values which represent changes in the listed representative kinetic energies of the utility and counter systems during exemplary 15° intervals of rotation of the common drive shaft 50, and it will be noted that these kinetic energy changes for each 15° interval of rotation of the drive shaft are equal but of opposite sign. Accordingly, the profile geometries of the balance gears 46, 48 also meet the requirement that the rate of interchange of kinetic energy between the two systems is equal but opposite in sign.

The kinetic energies of the utility and counter systems are also plotted in FIG. 6 for 180° rotation of the drive shaft 50, with the kinetic energies being of the values listed in Table III. It will be noted from FIG. 6 that the sum of these kinetic energies is constant, with this sum being of the indicated value 2.75.

Angular velocities of the driven utility and balance gears at constant velocity of the driving gears $\omega=1$ have also been determined for rotation of the drive shaft through 180°, and these velocities have been plotted in FIG. 5. It will be noted from FIG. 5 that the velocities of the driven utility and balance gears, and hence of the utility and balance systems, vary differently, as was, of course, known beforehand because of the different shapes of the pitchline profiles of the respective utility and balance gears.

It follows from the preceding that the profile equations for the balance gears will provide gears which will eliminate any unbalanced torque in the drive shaft 50 as long as the mass polar moments of inertia of the overall counter and utility systems bear the specified relation $I_4 = x^2 I_2$. Accordingly, the balance gears may be dimensioned with sole consideration for their adequate structural strength for the maximum loads involved and without consideration of the mass polar moment of inertia of the driven balance gear.

The equations 12, 13, 14, 15 and 16 are general and apply for the determination of the profile geometries of balance gears for use with a pair of utility gears of any known or determinable profile geometries. To demonstrate this, consider a pair of utility gears 60 and 62 (FIG. 7) of which the polar equation of the driver gear 60 is represented by the known equation of a second-order ellipse turning about its geometric axis, for example, with this equation being

Figure 7:
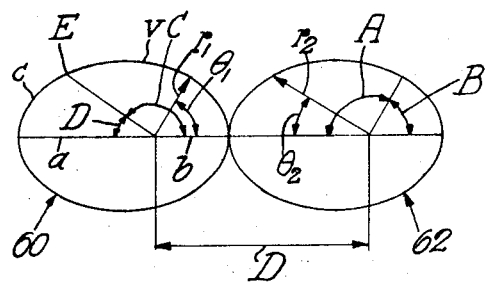
FIG. 7 is a diagrammatic layout of a pair of gears of arbitrary outline for reference purposes in the derivation of the correct profile geometries of modified gears embodying the same invention.

(17) $$r_1 = \frac{2ab}{(a+b)+(a-b)\cos 2\theta_1}$$

where $a$, $b$ and $\theta_1$ are the particulars denoted in FIG. 7 which show arbitrarily drawn pitchline profiles of the gears 60 and 62. The readily determinable equation of the companion driven utility gear 62 is

(18) $$r_2 = \frac{D(a+b)+D(a-b)\cos 2\theta_1 - 2ab}{(a+b)+(a-b)\cos \theta_1}$$

In obtaining values for $a$, $b$ and $D$, the lengths of pitchline radii $r_1$ and $r_2$ may be obtained from equations 17 and 18, and the pitchline profiles of the utility gears may then be laid out. On then using values of $r_1$ and $r_2$ and selecting a velocity ratio for the balance gears, the profile geometries of the latter will be obtained from the general equations 12 to 16 and the pitchline profiles may be laid out, with the balance gears thus obtained meeting the requirements of basic equation 5. However, in order to demonstrate that the general equations 12 to 16 will provide profile geometries of balance gears for use with utility gears of any known or determinable profile geometries which also lend themselves to meeting special requirements, such as providing for varying and constant velocity of the driven utility gear during each half-revolution thereof on constant velocity drive of the driving utility gear, for example, let it be assumed that the second-order elliptic gears 60 and 62 are to meet this very same exemplary requirement of varying and constant velocity of the driven gear at constant velocity of the driver gear. For this particular example, let it be required that on anticlockwise rotation of the driven gear 62 through one-half revolution (FIG. 7) the same have through a given angle A the characteristic varying angular velocity of a second-order elliptic gear at a given velocity ratio, and constant angular velocity on continued rotation through the angle B. For gear compatibility, the corresponding varying-velocity part $v$ of the pitchline profile of the driver gear 60 must extend over a determinable angle C (FIG. 7), followed by the corresponding constant-velocity part $c$ of this profile through the angle D. To introduce constant velocity in the utility gears, it is imperative that the constant and varying velocity parts of their pitchlines have at their junction the same angle of obliquity. Accordingly, the varying and constant velocity parts $v$ and $c$ of the pitchline of the driver gear 60 must have the same angle of obliquity at their junction E (FIG. 7). To achieve this, the angles $\theta_1$ of all radii $r_1$ which make up the varying-velocity part $v$ of the pitchline must bear a relation $n$ to corresponding angles of the same radii that would extend the varying-velocity pitchline part over the combined angles C and D, i.e., 180°. This relation is $n = 180/C$, OR $n = \pi/C$ (in radians). Accordingly, in order to apply equations 17 and 18 for the determination of radii $r_1$ and $r_2$ for the utility gears with the introduced constant velocity, these equations must be modified as follows.

(19) $$r_1 = \frac{2ab}{(a+b)+(a-b)\cos n\theta_1}$$

and

(20) $$r_2 = \frac{D(a+b)+D(a-b)\cos n\theta_1 - 2ab}{(a+b)+(a-b)\cos n\theta_1}$$

Actual pitchline geometries of these utility gears 60 and 62 with introduced constant velocity have been developed. Thus, for a given angle A of 96.65°, a given value of 3 inches for $b$, and a given velocity ratio of 6 to 1, the values of $a$, $D$, $C$ and $n$ were determined. These values are $a = 8.39899439$,
$D = 13.12205411$,
$C = 133.12929424°$, and
$n = 1.35206925$.

The expressions 19 and 20 yielded the values of radii $r_1$ and $r_2$ listed in Table IV below. This same Table IV also lists calculated values of $(r_1/r)^2$, and also of angles $\theta_2$ for radii $r_2$ which are coordinate to the listed radii $r_1$.

TABLE IV

| $\theta_1$, degrees | $r_1$ | $r_2$ | $\left(\frac{r_1}{r_2}\right)^2$ | $\theta_2$ |
|---|---|---|---|---|
| 0 | 3.00000000 | 10.12205411 | .08784259 | 0 |
| 15 | 3.06099353 | 10.06106058 | .09256296 | 4.48478660 |
| 30 | 3.25109347 | 9.87096064 | .10847759 | 9.21296000 |
| 45 | 3.59202610 | 9.53002801 | .14206614 | 14.47687888 |
| 60 | 4.11983802 | 9.00221609 | .20944085 | 20.68480700 |
| 75 | 4.87776515 | 8.24428896 | .35005425 | 28.47019530 |
| 90 | 5.88502825 | 7.23702586 | .66126699 | 38.86986120 |
| 105 | 7.05162987 | 6.07042424 | 1.34940068 | 53.51039610 |
| 120 | 8.05393254 | 5.06812157 | 2.52535201 | 74.17033180 |
| 133.12929424 | 8.39899439 | 4.72305972 | 3.16233378 | 96.65 |
| 180 | 8.39899439 | 3.72305972 | 3.16233378 | 180 |

Figure 8:
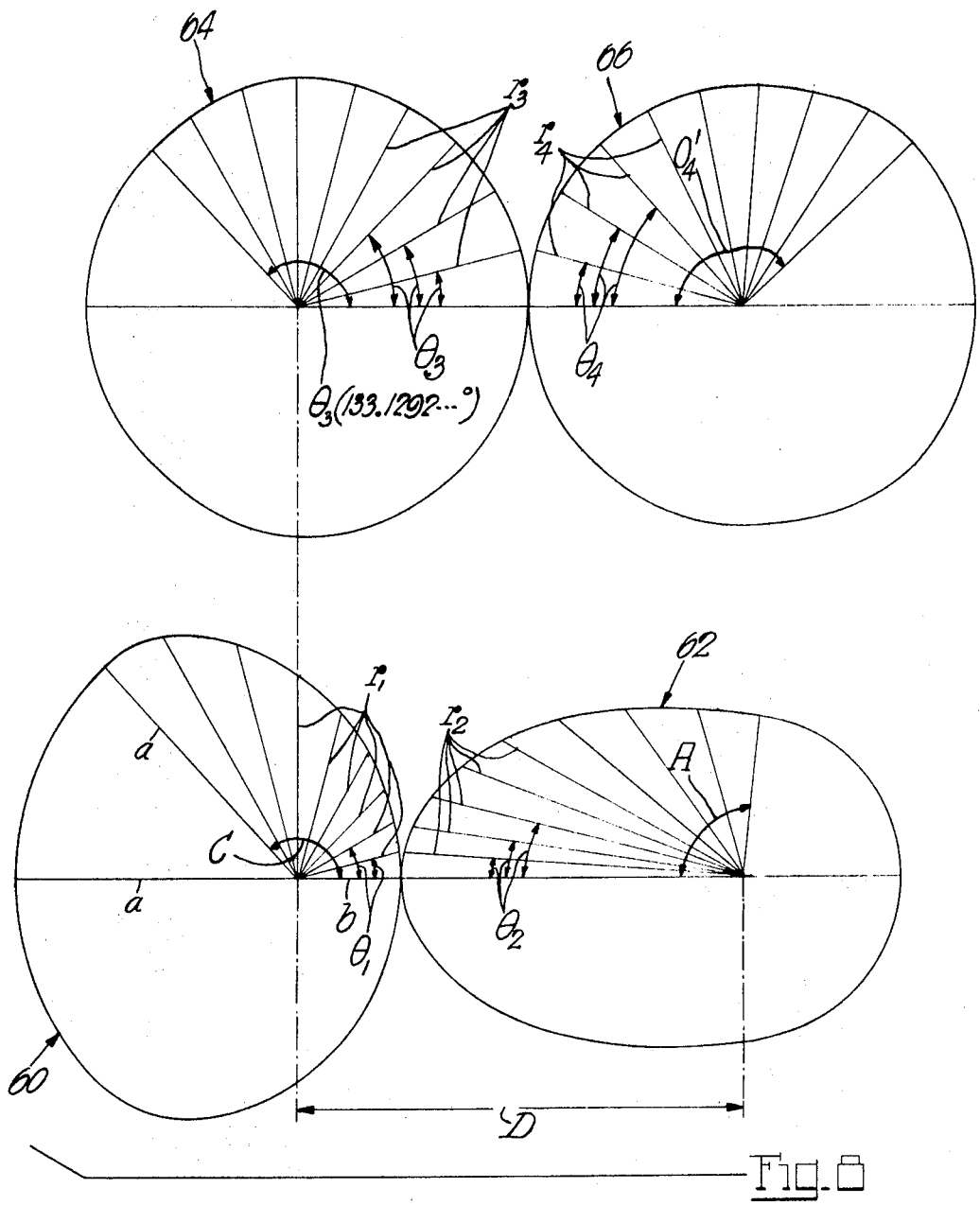
FIG. 8 illustrates the development of the pitchlines of the modified gears whose profile geometries were derived with reference to FIG. 7.

FIG. 8 shows at a reduced scale the actual pitchline profiles of the utility gears 60 and 62 plotted from the listed radii $r_1$ and $r_2$.

Having obtained values of $r_1$ and $r_2$, the profile geometries of the balance gears 64 and 66 (FIG. 8) may be obtained from the general equations 12 to 16 on first selecting a velocity ratio for these gears. Since the relatively large velocity ratio of 6 to 1 of the utility gears 60 and 62, if used for the balance gears 64 and 66, would produce cusp formations in the latter gears, the velocity ratio was selected at 1.17994544 which yielded a whole number for Z, namely the value 11.

In using the general equations 12 to 16 for balance gears, the following values were determined.

$Z = 11$, as already mentioned,
$x = 3.09398998$ $\left(\text{with } n_1 = \frac{180}{133.12929424}, \text{ and } n_2 = \frac{180}{96.65}\right)$, $\theta'_4 = 137.58925108°$, and also values of radii $r_3$ and $r_4$, and of $\theta_4$, listed in the following Table V. Also listed in Table V are values of $x^2(r_3/r_4)^2$.

TABLE V

| $\theta_3$, degrees | $r_3$ | $r_4$ | $x^2\left(\frac{r_3}{r_4}\right)^2$ | $\theta_4$ |
|---|---|---|---|---|
| 0 | 6.77574926 | 6.34630485 | 10.91215660 | 0 |
| 15 | 6.77504090 | 6.34701371 | 10.90743684 | 16.0125 |
| 30 | 6.77264794 | 6.34940617 | 10.89152230 | 32.0160 |
| 45 | 6.76758685 | 6.35446726 | 10.85793354 | 48.0018 |
| 60 | 6.75738680 | 6.36466731 | 10.79055892 | 63.9528 |
| 75 | 6.73588911 | 6.38616500 | 10.64994559 | 79.7543 |
| 90 | 6.68726908 | 6.43478503 | 10.33873289 | 95.4728 |
| 105 | 6.57430817 | 6.54774594 | 9.65059901 | 110.8178 |
| 120 | 6.36125053 | 6.76082058 | 8.47464777 | 125.3961 |
| 133.12929424 | 6.23327839 | 6.88877572 | 7.83766600 | 137.5892 |
| 180 | 6.23327839 | 6.88877572 | 7.83766600 | 180.0000 |

FIG. 8 shows at a reduced scale the actual pitchline profiles of the balance gears 64 and 66 plotted from the listed radii $r_3$ and $r_4$.

That the thus developed balance gears 64 and 66 meet the requirements of the basic equation 5 is evidenced by the fact that the sum of the kinetic energies expressed by the associated values of $(r_1/r_2)^2$ and $x^2(r_3/r_4)^2$ in the Tables IV and V, respectively, amounts to 11. The developed balance gears 64 and 66 also meet the further requirement that the rate of interchange of kinetic energy is equal but opposite in sign, for note in the following Table VI that the change $\Delta$ in kinetic energy $KE_2$ is indeed equal to, but of opposite sign as, the change $\Delta$ in kinetic energy $KE_4$ for every one of the listed intervals of $\theta^1\!\!\!\!/_3$.

TABLE VI

| $\theta_{1/3}$, degrees | $KE_2$ | $KE_4$ |
|---|---|---|
| 0-15 | .00472037 | −.00471976 |
| 15-30 | .01591463 | −.01591454 |
| 30-45 | .03358855 | −.03358876 |
| 45-60 | .06737471 | −.06737462 |
| 60-75 | .14061340 | −.14061333 |
| 75-90 | .31121274 | −.31121270 |
| 90-105 | .68813369 | −.68813388 |
| 105-120 | 1.17595133 | −1.17595124 |
| 120-133.12929424 | .63698177 | −.63698177 |

That the equations 12 to 16 for the determination of the profile geometries of balance gears are indeed general is further demonstrated by the gear arrangement of FIG. 9, consisting of utility gears 70 and 72 and balance gears 74 and 76, of which the driving utility and balance gears 70 and 74 are mounted on a drive shaft 78. The utility gears 70 and 72 are in this instance center-mounted elliptic gears the profile geometries of which were determined on the basis of an exemplary velocity ratio 2.01 to 1, and also to meet the requirement of embodying this velocity ratio more than once, in this instance twice, in these gears. For the determination of the profile geometries of these utility gears, recourse was had to the following expressions $$r_1 = \frac{2ab}{(a+b)+(a-b)\cos n\theta_1}$$

and $$r_2 = \frac{D(a+b)+D(a-b)\cos n\theta_1 - 2ab}{(a+b)+(a-b)\cos n\theta_1}$$

These expressions for $r_1$ and $r_2$ are known expressions for the exemplary elliptic utility gears, except that $n$ is introduced to meet the above requirement of embodying the velocity ratio twice in these gears, with $n$ being, therefore, 2. With given values of $D$=10 inches, and 2.01 to 1 for the velocity ratio, the values of $a$ and $b$ were determined, with $a$=5.86391399 and $b$=4.13608601. With these exemplary values of $D$, $a$ and $b$, the lengths of sufficient pitchline radii $r_1$ were determined from the above expression for $r_1$ to plot the pitchlines of gears 70 and 72 which are shown at a reduced scale in FIG. 9. Since the gears 70 and 72 are identical, there was no need to determine values of $r_2$ and their angles $\theta_2$.

With values of $r_1$, $r_2$ and $\theta_1$ known, the profile geometries of balance gears were next determined on the basis of the general equations 12 to 16 and for a selected velocity ratio $V_r$=2.01 to 1 which in this instance is the same as that of the utility gears. It was found, however, that with this exemplary velocity ratio $V_r$=2.01:1, the balance gears would have cusp formations. Therefore, a different velocity ratio $V_r$=1.2:1 was selected which produced the cuspless balance gears 74, 76. Thus, in using $V_r$=1.2 and known values of $r_1$, $r_2$ and $\theta_1$, the general equations 12 to 16 yielded values of $Z$=5.44747177
$x$=2.09046961 (for $n_1$=$n_2$=2), and values of sufficient radii $r_3$ and $r_4$ and of angles $\theta_4$, for plotting the pitchlines of the balance gears 74 and 76, with these pitchlines being shown at a reduced scale in FIG. 9. Determination of actual values of $r_3$ and $r_4$ did yield exemplary values for $r_3{}_{max}$=5.15570200, for $r_3{}_{min}$=4.70030810, for $r_4{}_{max}$=5.29969190, and for $r_4{}_{min}$=4.84429800. Determination of kinetic-energy values of $(r_1/r)^2$ and $x^2(r_3/r_4)^2$ also proved that the determined balance gears meet the requirement of basic equation 5.

Reference is now had to FIG. 10 which shows a pair of elliptic utility gears 80 and 82 of which the driving gear 80 is center-mounted, with the gear ratio between the driven gear 82 and the driving gear 80 being other than 1 to 1, and being in this instance 2 to 1. For the determination of the profile geometries of these utility gears, recourse was had to the following applicable expressions:

$$r_1 = \frac{2ab}{(a+b)+(a-b)\cos n\theta_1}$$

and $$r_2 = \frac{D(a+b)+D(a-b)\cos n\theta_1 - 2ab}{(a+b)+(a-b)\cos n\theta_1}$$

where $n$=number of lobes 1 of driving utility gear 80=2.

With the given value of $D$ being 10 inches, and for a given velocity ratio of 2 to 1 for the utility gears, the following values were determined.

$a$=7.38796125, and
$b$=5.85786437.

With these values determined, lengths of sufficient coordinate radii $r_1$ and $r_2$, and also of angles $\theta_2$ for $r_2$, were determined to plot the pitchlines of the utility gears 80 and 82, with these plotted pitchlines being shown at a reduced scale in FIG. 10.

With values of $r_1$, $r_2$ and $\theta_1$ known, the profile geometries of balance gears 84 and 86 were next determined on the basis of the general expressions 12 to 16, and for a selected velocity ratio $V_r$=1.5 to 1. This yielded exemplary values of $Z$=12.80, and $x$=1.45098190 for $n_1$=2 and $n_2$=1. The lengths of sufficient pitchline radii $r_3$ at angles $\theta_3$, and of coordinate pitchline radii $r_4$, and also values of $\theta_4$ of the latter radii, were then determined to plot the pitchline profiles of the respective driving and driven balance gears 84 and 86, with these plotted pitchline profiles being shown at a reduced scale in FIG. 10. Determination of pitchline radii $r_3$ and $r_4$ did yield exemplary values for $r_{3max}$=6.93712320, for $r_{3min}$=6.01583510, for $r_{4max}$=3.98416490, and for $r_{4min}$=3.06287680. Determination of kinetic-energy values of $(r_1/r_2)^2$ and $x^2 (r_3/r_4)^2$ also proved that the determined balance gears meet the requirement of basic equation 5.

While in the described exemplary gear systems the velocity ratio of the balance gears is different from that of the utility gears to avoid cusp formations in the balance gears, it is, of course, possible to arrive at cuspless balance gears of the same velocity ratio as the utility gears, especially if the velocity ratio of the utility gears is relatively low.

The general equations 12 to 16 also lend themselves to the determination of balance gears which balance a system that rotates at one given constant angular velocity and whose changes in energy are kinetic and/or potential and occur periodically in each cycle, with these energy changes producing varying torque in the drive shaft. Such a system may provide for example, a periodically shifted weight on a radial arm directly on the drive shaft, in which case the periodic energy change is kinetic and potential. To the end of arriving at such balance gears, it is merely necessary to specify a pair of reference surge gears of which the kinetic energy of the driven gear would produce the same cyclically varying torque in the drive shaft as the system if the driving surge gear were carried by the drive shaft. These reference surge gears, while obviously nonexistent in this case, serve merely to furnish values of $r_1$, $r_2$ and $\theta_1$ for the determination, on hand of the general equations 12 to 16, of profile geometries of actual balance gears which will balance the system.

What I claim is:

1. The combination of a rotary utility system, a drive therefor including a drive shaft and two meshing utility gears of a given velocity ratio and a given gear ratio, of which each gear has an axis of symmetry, and one gear turns with said shaft and the other gear turns with, and is included in, said utility system, a rotary counter system, and a drive for said counter system providing two meshing balance gears and including said drive shaft, said balance gears having a velocity ratio and said given gear ratio, with each balance gear having an axis of symmetry and one of said balance gears turning with said drive shaft and the other balance gear turning with, and being included in, said counter system, and the pitchline profiles of said other gears and mass polar moments of inertia of said systems being so different that the sum of the kinetic energies of said systems is at any instant constant at constant velocity of said drive shaft.

2. The combination of claim 1, in which the velocity ratio of said balance gears is the same as that of said utility gears.

3. The combination of claim 1, in which the velocity ratio of said balance gears is different from that of said utility gears.

4. The combination of claim 1, in which said given gear ratio is other than 1 to 1.

5. The combination of claim 1, in which said utility gears are elliptic gears.

6. Counter surge gearing for a pair of specified meshing driving and driven utility gears with rotary axes spaced apart a distance D and having a given velocity ratio and a given gear ratio, with each gear having an axis of symmetry, and said driving and driven gears having pitchline profiles determined by the ends of pitchline radii $r_1$ and $r_2$, respectively, of which coordinate radii $r_1$ and $r_2$ are continuous with each other on rotation of said gears, and all radii $r_1$ being spaced by associated angles $\theta_1$ from 0° to 360° unidirectionally from the axis of symmetry of said driving gear, said gearing providing a pair of driving and driven meshing balance gears of a given velocity ratio $V_r$, with each of said balance gears having an axis of symmetry and a rotary axis, and the pitchlines of said driving and driven balance gears being determined by the ends of pitchline radii $r_3$ and $r_4$, respectively, of which coordinate radii $r_3$ and $r_4$ are continuous with each other on rotation of said balance gears, with said radii $r_3$ being spaced by associated angles $\theta_3$ from 0° to 360° unidirectionally from the axis of symmetry of said driving balance gear, and the lengths of said coordinate pitchline radii $r_3$ and $r_4$ satisfy the relation $$\left(\frac{r_1}{r_2}\right)^2 + x^2\left(\frac{r_3}{r_4}\right)^2 = Z$$

where $r_1$, $r_2$ and $r_3$, $r_4$ are coordinate radii, $$Z = \frac{V_r^2\left(\frac{r_{1max}}{r_{2min}}\right)^2 - \left(\frac{r_{1min}}{r_{2max}}\right)^2}{V_r^2 - 1}$$

where max and min denote maximum and minimum lengths, respectively of the radii $r_1$ and $r_2$, and $$x = \frac{n_2}{\pi}\int_0^{\frac{\pi}{n_1}} \sqrt{Z - \left(\frac{r_1}{r_2}\right)^2}\, d\theta_1$$

where $n_1$ is equal to 180° divided by the subtended angle in degrees between $r_{1\,min}$ and $r_{1\,max}$ of the driving utility gear, and $n_2$ is equal to 180° divided by the subtended angle in degrees between $r_{2\,min}$ and $r_{2\,max}$ of the driven utility gear.

7. Counter surge gearing for a pair of specified meshing driving and driven utility gears with rotary axes spaced apart a distance D and having a given velocity ratio and a given gear ratio, with each gear having an axis of symmetry, and said driving and driven gears having pitchline profiles determined by the ends of coordinate pitchline radii $r_1$ and $r_2$, respectively, which are continuous with each other on rotation of said gears, and all radii $r_1$ being spaced by associated angles $\theta_1$ from 0° to 360° unidirectionally from the axis of symmetry of said driving gear, said gearing providing a pair of driving and driven balance gears of a given velocity ratio $V_r$, with each of said balance gears having an axis of symmetry and a rotary axis, and the pitchline profiles of said driving and driven balance gears being defined by the ends of pitchline radii $r_3$ and $r_4$, respectively, of which the lengths of said radii $r_3$ are determined by $$r_3 = \frac{D\sqrt{Z - \left(\frac{r_1}{r_2}\right)^2}}{x + \sqrt{Z - \left(\frac{r_1}{r_2}\right)^2}}$$

where $r_1$ and $r_2$ are coordinate radii, and all radii $r_3$ of determined lengths are spaced, unidirectionally from the axis of symmetry of said driving balance gear, by angles $\theta_3$ equal to the angles $\theta_1$ associated with the radii $r_1$ used in the length determination of $r_3$, $$Z = \frac{V_r^2\left(\frac{r_{1max}}{r_{2min}}\right)^2 - \left(\frac{r_{1min}}{r_{2max}}\right)^2}{V_r^2 - 1}$$

where max and min denote maximum and minimum lengths, respectively, of the radii $r_1$ and $r_2$, $$x = \frac{n_2}{\pi}\int_0^{\frac{\pi}{n_1}} \sqrt{Z - \left(\frac{r_1}{r_2}\right)^2}\, d\theta_1$$

where $n_1$ is equal to 180° divided by the subtended angle in degrees between $r_{1\,min}$ and $r_{1\,max}$ of the driving utility gear, and $n_2$ is equal to 180° divided by the subtended angle in degrees between $r_{2\,min}$ and $r_{2\,max}$ of the driven utility gear, and the radii $r_4$ are of lengths equal to D minus the lengths of their coordinate radii $r_3$.

8. Counter surge gearing as in claim 7, in which the velocity ratio $V_r$ of said balance gears is selectable.

9. Counter surge gearing as in claim 7, in which the lengths of the pitchline radii $r_4$ are determinable by $$r_4 = \frac{Dx}{x + \sqrt{Z - \left(\frac{r_1}{r_2}\right)^2}}$$

where $r_4$ is coordinate to that $r_3$ whose associated angle $\theta_3$ is equal to the associated angle $\theta_1$ of the radius $r_1$ used in determining $r_4$.

10. Counter surge gearing as in claim 7, in which the radii $r_4$ are spaced, unidirectionally from the axis of symmetry of said driven balance gear by angles $\theta_4$ which are determined by $$\theta_4 = \frac{1}{x} \int_0^{\theta_1} \sqrt{Z - \left(\frac{r_1}{r_2}\right)^2} \, d\theta_1$$

where $r_1$ and $r_2$ are coordinate radii, and $\theta_4$ is the angle of that radius $r_4$ which is coordinate to that radius $r_3$ whose angle $\theta_3$ is equal to the angle $\theta_1$ of the radius $r_1$ used in the determination of $\theta_4$.

11. Counter surge gearing as in claim 7, in which said utility gears have a gear ratio other than 1 to 1, with $n_1$ and $n_2$ being different whole numbers.

12. Counter surge gearing as in claim 7, in which said utility gears embody said given velocity ratio more than once, with 1 said driving and driven utility gears having than once, with $n_1$ and $n_2$ being equal whole numbers greater than 1.

13. Counter surge gearing as in claim 7, in which said utility gears have parts of their pitchlines concentric with their respective rotary axes.

14. Counter surge gearing as in claim 7, in which said utility gears are elliptic gears.

15. The combination of a pair of meshing driving and driven utility gears and a shaft carrying said driving gear, said gears having a given velocity ratio and a given gear ratio, and their rotary axes being spaced apart a distance D, and each gear having an axis of symmetry, with said driving and driven gears having pitchline profiles determined by the ends of coordinate pitchline radii $r_1$ and $r_2$, respectively, which are continuous with each other on rotation of said gears, and all radii $r_1$ being spaced by associated angles $\theta_1$ from 0° to 360° unidirectionally from the axis of symmetry of said driving gear, and counter surge gearing providing a pair of driving and driven balance gears of a given velocity ratio $V_r$, with each of said balance bears having an axis of symmetry and a rotary axis, and the pitchline profiles of said driving and driven balance gears being defined by the ends of pitchline radii $r_3$ and $r_4$, respectively, of which the lengths of said radii $r_3$ are determined by $$r_3 = \frac{D\sqrt{Z - \left(\frac{r_1}{r_2}\right)^2}}{x\sqrt{Z - \left(\frac{r_1}{r_2}\right)^2}}$$

where $r_1$ and $r_2$ are coordinate radii, and all radii $r_3$ of determined lengths are spaced unidirectionally from the axis of symmetry of said driving balance gear by angles $\theta_3$ equal to the angles $\theta_1$ associated with the radii $r_1$ used in the length determination of $r_3$, $$Z = \frac{V_r^2 \left(\frac{r_{1\,max}}{r_{2\,min}}\right)^2 - \left(\frac{r_{1\,min}}{r_{2\,max}}\right)^2}{V_r^2 - 1}$$

where max and min denote maximum and minimum lengths, respectively, of the radii $r_1$ and $r_2$, and $$x = \frac{n_2}{\pi} \int_0^{\frac{\pi}{n_1}} \sqrt{Z - \left(\frac{r_1}{r_2}\right)^2} \, d\theta_1$$

where $n_1$ is equal to 180° divided by the subtended angle in degrees between $r_{1\,min}$ and $r_{1\,max}$ of the driving utility gear, and $n_2$ is equal to 180° divided by the subtended angle in degrees between $r_{2\,min}$ and $r_{2\,max}$ of the driven utility gear, and the radii $r_4$ are of lengths equal to D minus the lengths of their coordinate radii $r_3$, said driving balance gear being carried by said shaft, and said balance gears being meshed so that pitchline radii $r_3$ and $r_4$ of maximum and minimum lengths, respectively, are continuous with each other when pitchline radii $r_1$ and $r_2$ of minimum and maximum lengths, respectively, of said driving and driven utility gears are continuous with each other.

16. The combination of claim 15, in which the velocity ratio $V_r$ of said balance gears is selectable.

17. The combination of claim 15, in which the lengths of the pitchline radii $r_4$ are determinable by $$r_4 = \frac{Dx}{x + \sqrt{Z - \left(\frac{r_1}{r_2}\right)^2}}$$

where $r_4$ is coordinate to that radius $r_3$ whose angle $\theta_3$ is equal to the angle $\theta_1$ of the radius $r_1$ used in determining $r_4$.

18. The combination of claim 15, in which the radii $r_4$ are spaced unidirectionally from the axis of symmetry of said driven balance gear by angles $\theta_4$ which are determined by $$\theta_4 = \frac{1}{x} \int_0^{\theta_1} \sqrt{Z - \left(\frac{r_1}{r_2}\right)^2} \, d\theta_1$$

where $\theta_4$ is the angle of that radius $r_4$ which is coordinate to that radius $r_3$ whose angle $\theta_3$ is equal to the angle $\theta_1$ of the radius $r_1$ used in the determination of $\theta_4$.

19. The combination of claim 15, in which the mass polar moment of inertia of said driven utility gear is I, and the mass polar moment of inertia of said driven balance gear is $x^2I$, so that the sum of the kinetic energies of said driven utility and balance gears is constant at any instant at constant velocity of said shaft.

20. The combination of claim 15, which further provides a rotary utility system turning with, and being driven by, said driven utility gear and including the latter, and a rotary counter system turning with, and driven by, said driven balance gear and including the latter, with said utility system having a mass polar moment of inertia I, and said counter system having a mass polar moment of inertia equal to $x^2I$, so that the sum of the kinetic energies of said systems is constant at any instant at constant velocity of said shaft.